Feb. 28, 1967 S. H. BLAZEY 3,306,094

METHOD OF AND MEANS FOR CALIBRATING THERMO-RESPONSIVE POWER DEVICES

Filed Sept. 29, 1964 3 Sheets-Sheet 1

Inventor

Sidney Henry Blazey

BY

E. C. Johnson

Attorney

Inventor
Sidney Henry Blazey
BY
[signature]
Attorney

Inventor
Sidney Henry Blazey
BY
[signature]
Attorney

United States Patent Office 3,306,094

Patented Feb. 28, 1967

3,306,094

METHOD OF AND MEANS FOR CALIBRATING THERMO-RESPONSIVE POWER DEVICES

Sidney Henry Blazey, Kensworth, near Dunstable, England, assignor to General Motors Corporation, Detroit, Mich., a corporation of Delaware Filed Sept. 29, 1964, Ser. No. 399,984
Claims priority, application Great Britain, Oct. 3, 1963, 38,933/63
6 Claims. (Cl. 73—1)

This invention relates to the manufacture of thermo-responsive power devices and in particular to a method of and means for calibrating thermo-responsive power devices.

The invention relates especially to the manufacture of thermo-responsive power devices in which a pin slidably mounted in a wall of a closed container is adapted to be moved axially relative to the container by a change in the volume of a body of thermo-responsive material (for example wax) sealed within the container, in response to temperature changes.

In the calibration of such power devices so that, at a predetermined temperature the pin extends from the container by a predetermined distance, it is customary to reduce the volume of the space within the container, while the latter and its filling of thermo-responsive material is maintained at the predetermined temperature, until the pin extends the correct distance from the container.

In the calibration of such a thermo-responsive power device in accordance with the present invention the volume of the container is reduced by reducing the circumferential length of an annular area of the container without changing the cross sectional shape of the container in the area. The reduction is effected by permanent deformation of the wall of the container in the area.

Preferably the aforesaid reduction in the circumferential length is made by reducing the taper of a frusto-conical portion of the container so that it is deformed from a frusto-conical shape to a substantially cylindrical shape; the deformation is preferably effected by squeezing the tapered portion of the container in a multiple jaw collet.

A preferred apparatus for carrying out the calibration of a thermo-responsive power device as aforesaid by the method according to the invention comprises a multiple jaw collet within which the power device is adapted to be located on a support, a plurality of slide blocks respectively carrying said collet jaws and mounted to slide radially of the vertical axis of the collet in a plurality of radial slideways in said support, a carrier member arranged for vertical movement relative to said support and carrying a plurality of cam blocks, said cam blocks and said slide blocks having cooperating cam faces arranged so that relative vertical movement in one direction between said support and said carrier member effects radial inward movement of said slide blocks to force said jaws against the container of the thermo-responsive device, a power source for effecting said relative movement of said carrier and support, and an adjustable stop member arranged so as, upon the extension of the pin from the container to a predetermined extent to actuate a switch device to cut off the power supply and arrest the relative movement between the support and carrier member.

The scope of the invention is defined by the appended claims; and the method to be performed is hereinafter particularly described with reference to the accompanying drawings of a preferred embodiment of an apparatus for carrying out the calibration of a thermo-responsive power device and in which:

Figure 1:
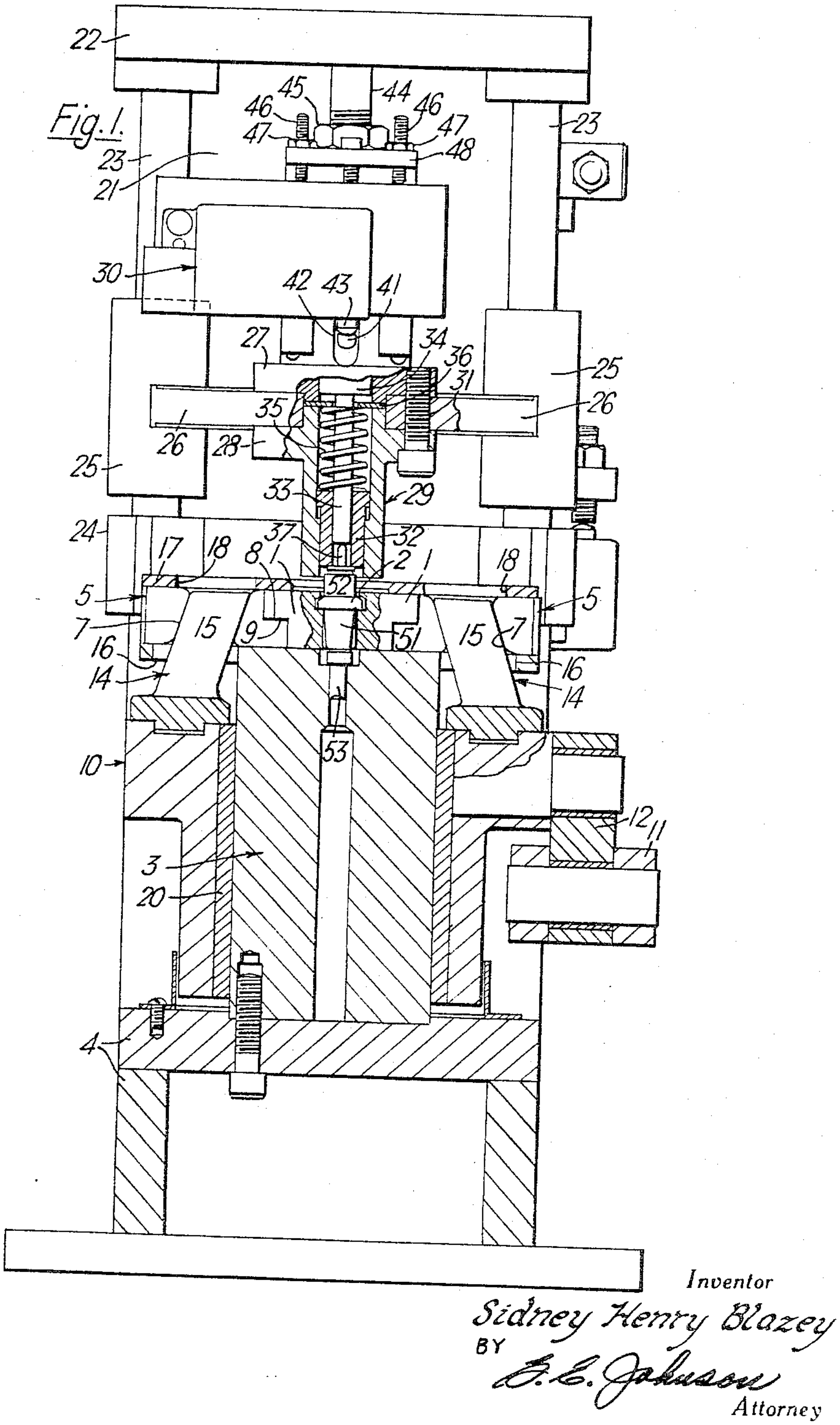
FIGURE 1 is a part sectional elevation of the calibration apparatus.

The calibration apparatus shown in FIGURE 1 comprises a multiple jaw collet, in this case having four collet jaws 1 (of which only two opposed jaws are shown in FIGURE 1) within which a thermo-responsive power device 2 is adapted to be mounted on a support member 3 bolted to a fixed frame 4.

Figures 11, 12:
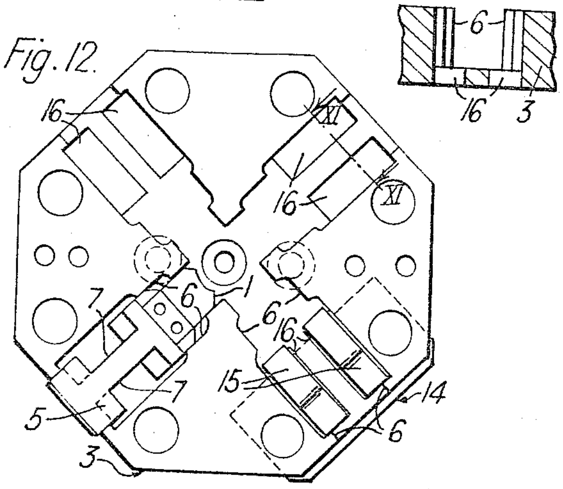
FIGURE 11 is a section on the line XI—XI of FIGURE 12.
FIGURE 12 is a plan of the support member of the apparatus shown in FIGURE 1, showing the arrangement of a slide block and a cam block relative thereto.

The collet jaws 1 are respectively secured to the inner ends of four slide blocks 5 (FIGURES 7 and 8) which are slidably mounted in four radial slideways 6 machined in the upper portion of the support member 3 and are equi-spaced about the vertical axis of the multiple jaw collet. One of the slide blocks 5 is shown in position in its slideway 6 in FIGURE 12. At opposite sides of each slide block 5 there are guide recesses 7 which extend downwards and radially outwards from the upper to the lower face of each slide block 5 (FIGURE 8).

Figure 7:
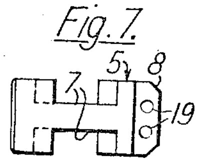
FIGURES 7 and 8 are a plan and side elevation respectively of a slide block shown in FIGURE 1.
Figure 8:
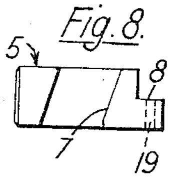
Figure 9:
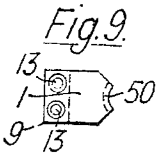
FIGURES 9 and 10 are a plan and vertical section respectively of one of the collet jaws shown in FIGURE 1.
Figure 10:
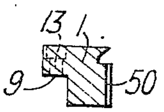

As shown in FIGURES 7 and 8 the front end of each of the slide blocks 5 is formed with a rectangular stepped portion 8; and as shown in FIGURES 9 and 10 the rear of each of the collet jaws 1 is formed with a complementary stepped portion 9 by which the collet jaws are secured to the inner ends of the slide blocks, as shown in FIGURE 1.

Figure 4:
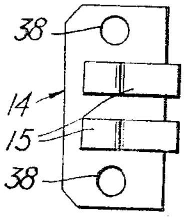
FIGURES 4, 5 and 6 are a plan, end elevation, and side elevation respectively of a cam block shown in FIGURE 1.
Figure 6:
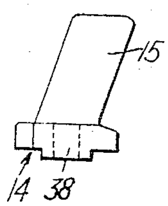
Figure 5:
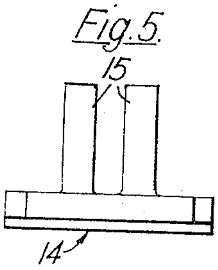

Mounted coaxially below the support member 3 and adapted for vertical movement relative thereto is a carrier member 10 which may be reciprocated vertically relative to the support member 3 by means of a power actuated arm 11 pivotally connected to the carrier member 10 by a link 12. On the upper face of the carrier member 10 are secured four cam blocks 14 (FIGURES 4 to 6) each of which has two upwardly extending and radially inwardly inclined cam plates 15, the latter extending through openings 16 in the support member 3 (FIGURES 1 and 12) and engaging in the guide recesses 7 of a respective slide block 5, the arrangement being such that vertical movement of the carrier member 10 effects horizontal movement of the radially movable slide blocks 5 through the cam action between the inclined surfaces of the cam plates 15 and the complementary inclined surfaces of the guide recesses 7 of the slide blocks 5.

A cover plate 17 is secured to the upper face of the support member 3 and is formed with a central opening therein and with four pairs of openings 18 which overlie the openings 16 in the support member 3, the cover plate retaining the slide blocks 5 in their respective slideways 6.

A bearing sleeve 20 is interposed between the support member 3 and the carrier member 10.

The apparatus includes a vertical frame member 21 with a transverse head member 22 secured thereto; and a pair of vertical guide bars 23 are secured between the head member 22 and an intermediate frame member 24. Slidably mounted on the guide bars 23 are a pair of guide sleeves 25 each of which carries a bracket 26. Located between the brackets 26 and coaxially above the support member 3 are the upper and lower parts 27, 28 of a housing 29 for mechanism to actuate a switch 30 which controls the operation of the carrier member 10. The housing members 27, 28 are secured to the brackets 26, as by bolts 31; and within the lower housing part 28 there is slidably mounted a sleeve 32 in the central bore of which is slidably mounted a spindle 33 which is integral with and extends downwardly from a switch actuator plunger 34 which is slidably mounted in the upper part 27 of the housing 29.

Figures 2, 3:
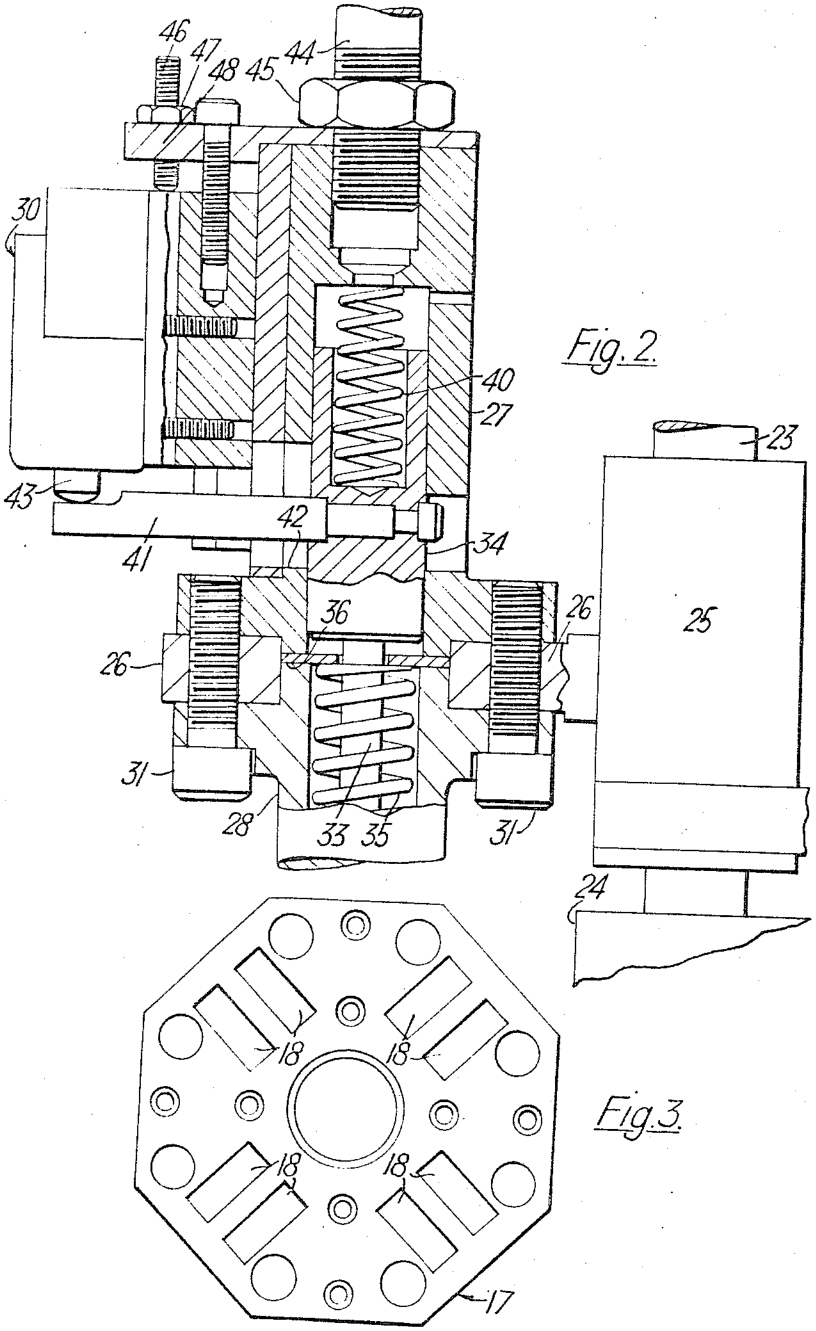
FIGURE 2 is a part sectional side elevation, to an enlarged scale, of part of the apparatus shown in FIGURE 1.
FIGURE 3 is a plan of a cover plate for the top of a support member shown in FIGURE 1.

A helical spring 35 extends about the spindle 33, one end of the spring 35 abutting the upper end of the sleeve 32 and its other end abutting a plate 36 which is clamped between the upper and lower housing parts 27, 28 and has an aperture through which the spindle 33 freely extends. The lower end of the sleeve 32 is, as shown in FIGURE 1, adapted to engage the upper end of the housing of the thermo-responsive device 2; and the lower end of the spindle 33 is adapted to engage the upper end of the actuator pin 37 of the thermo-responsive device 2. The spindle 33 is adapted to be pressed into engagement with said pin 37 by means of a helical spring 40 (FIGURE 2) the lower end of which engages in the base of a recess in the upper end of the plunger 34 and the upper end of which engages the upper end of the bore in the housing part 27 in which the plunger 34 is slidably mounted.

The plunger 34 has secured therein a transversely extending pin 41 which extends through an opening 42 in the upper housing part 27 and is adapted to engage the lower end of a plunger 43 which actuates the contacts of the switch 30.

The vertical position of the housing 29 for the switch actuator mechanism can be adjusted by means of a bolt 44 which is rotatably mounted in the cross member 22 of the frame and is threaded into the upper end of the housing member 27 and secured in its adjusted position by a lock nut 45; and the position of the switch and its plunger 43 relative to the housing 29 can be adjusted by means of adjustable screws 46 and lock nuts 47 in a cover member 48 secured to the upper housing part 27. The front stepped portion 8 of each of the slide blocks 5 is formed with a pair of threaded openings 19 therein; and the stepped portion 9 of each of the collet jaws 1 is formed with counterbored openings 13 therein by which the collet jaws 1 can be secured to the inner ends of the slide blocks 5 by means of screws (not shown).

Each of the cam blocks 14 is formed with a pair of openings 38 therein by which the cam blocks can be secured to the upper face of the carrier member 10 by means of bolts; the bolts are omitted from the drawing for the sake of clarity.

As shown in FIGURES 9 and 10 the front portion of each of the collet jaws 1 is formed with a recessed portion 50 which, as shown in FIGURE 9, is arcuate when viewed in plan, the recessed portion 50 being adapted to engage a portion of the outer periphery of the wall of the container of the thermo-responsive device 2.

The thermo-responsive power device 2 shown in FIGURE 1 of the kind previously referred to herein, and has a container or body 51 formed as a substantially cylindrical casing one end of which is closed and the other of which is outwardly flanged and crimped over a radial flange at one end of a cylindrical bush 52 which forms the other part of the body of the power element 2. Also clamped between the flanges on the bush and the casing, but not shown in the drawing, is an annular radial flange at one end of a sleeve of synthetic rubber or like material which extends coaxially within and is spaced from the inner wall of the body 51, the end of the sleeve opposite the flange being closed and terminating short of the end wall of the casing 51. The bush 52 has a coaxial bore therethrough which constitutes a guide bore for the actuator pin 37 one end of which extends from the bush 52 and the other end of which extends within the rubber sleeve within the casing 51.

The thermo-responsive power element has between the rubber sleeve and the inner wall of the casing 51 a material such as micro-crystalline wax which changes from a solid to a liquid state in response to temperature changes at or near a predetermined temperature, the change in volume of the material causing axial movement of the pin 37 relative to the casing 51 and bush 52.

The casing 51 is initially formed, as shown in FIGURE 1, with a slight taper from the flanged end towards the base thereof. For example the external diameter of the casing adjacent the flanged end may be from .495 inch to .505 inch and, adjacent its base, .475 inch to .470 inch, the length of the casing between flange and base being .620 inch to .615 inch.

In order to calibrate the thermo-responsive power device 2 it is first heated to a predetermined temperature, conveniently the temperature at which the pin is intended to initiate actuation of another device, for example a valve in a motor vehicle coolant circulation system, and is then placed within the four jaws 1 of the collet at the upper end of the support 10, the lower end of the casing 51 resting on a stud 53 located coaxially in a central recess at the upper end of the support 10.

Prior to the insertion of the thermo-responsive power device 2 within the jaws 1 of the multi jaw collet the sleeves 25 are moved upwardly on the guide bars 23 so as to raise the housing and switch mechanism 29, 30 and the members associated therewith. The housing 29 is then lowered until the sleeve 32 resiliently engages the upper end of the guide bush 52 and the lower end of the spindle 33 engages the upper end of the pin 37 of the power device 2.

Power is then applied to the arm 11 so as to move the carrier member 10 downwardly relative to the fixed support 3. The cam action between the cam plates 15 of the cam blocks 14 secured to the carrier 10 and the guide recesses 7 of the slide blocks 5 causes the slide blocks 5 to move radially inwards so that the collet jaws 1 carried on the slide blocks 5 are forced radially inwards against the tapered wall 51 of the casing of the thermo-responsive power device 2, the taper of the walls thereby being reduced so that the casing 51 approximates to a cylindrical shape. As a result, the volume of the space enclosed by the casing is reduced, and as the thermo-responsive material within the casing 51 is substantially incompressible the pin 37 is moved axially outwards from the casing 51 when the free end of the pin 37 presses the spindle 33 upwards. The plunger 34 at the upper end of the spindle 33 is accordingly moved upwards and the transverse pin 41 extending from the plunger 34 engages the switch plunger 43 and, after a predetermined movement of the pin 37 actuates the switch so as to cut off the power supply to the arm 11 and thus arrest the downward movement of the carrier member 10. In this way each thermo-responsive power device can be calibrated so that the end of the pin extends by a predetermined amount from the casing of the device when the power device is at a predetermined temperature.

After the calibration operation has been effected the carrier member 10 is moved downwardly and the housing 29 and switch 30 are moved upwardly to enable the power device 2 to be removed from the collet jaws 1.

I claim:

1. A method of calibrating a thermo-responsive power device in which a pin slidably mounted in a wall of a substantially cylindrical closed container is adapted to be moved axially relative to the container by a change in the volume of a body of thermo-responsive material sealed within the container, in response to temperature changes, comprising bringing the device and said material therein to a predetermined temperature and reducing the volume of the container by applying pressure thereto so as to reduce the circumferential length of an annular area of the container, without changing the cross-sectional shape of the container in the area, until said pin extends a predetermined distance from the container.

2. A method according to claim 1, in which said reduction in circumferential length is effected by reducing the taper of a frusto-conical portion of the container.

3. A method according to claim 1, said container having a slight taper towards the end thereof opposite the wall in which the pin is mounted, and said reduction in the circumferential length being effected by applying radial pressure to the side wall of the container so as to deform at least a portion of the side wall in said area from a frusto-conical to a substantially cylindrical shape.

4. A method according to claim 1, in which reduction in circumferential length of said area is effected by permanent deformation of the side wall of the container in the area.

5. Apparatus for carrying out the calibration of a thermo-responsive power device in which a pin slidably mounted in a wall of a closed container is adapted to be moved axially relative to the container by a change in the volume of a body of thermo-responsive material sealed within the container, in response to temperature changes, comprising a multiple jaw collet within which the power device is adapted to be located coaxially of the collet jaws, a support member, a plurality of slide members respectively carrying said collet jaws and mounted to slide radially of the vertical axis of the collet on said support member, each of said jaws having an arcuate recessed portion, said slide members respectively carrying cam surfaces thereon, a plurality of cam members secured on a carrier member arranged for vertical movement relative to said slide members, a power source for effecting vertical movement of said carrier member relative to said slide members, said slide members and said cam members having cooperating cam faces arranged so that relative vertical movement in one direction between said slide members and said cam members effects radial inward movement of said slide members to force the arcuate recessed portions of said jaws against the container of the thermo-responsive device, a power source for effecting said relative movement of said slide and cam members, and an adjustable stop member arranged so as, upon the extension of the pin from the container to a predetermined extent to actuate a switch device to cut off the power supply and arrest the said relative movement.

6. A method of calibrating a thermo-responsive device having two telescopically arranged members one of which contains a thermo-responsive material expandable relatively to move the other when heated, said method comprising maintaining the device at a predetermined temperature, uniformly squeezing the perimeter of said one member, and terminating the squeezing action when a predetermined relative movement of said members is effected.

References Cited by the Examiner

UNITED STATES PATENTS

| | | | |
|---|---|---|---|
| 2,714,759 | 8/1955 | Von Wangenham | 73—1 |
| 2,889,700 | 6/1959 | Wood et al. | 73—1 |

LOUIS R. PRINCE, *Primary Examiner.*

S. C. SWISHER, *Assistant Examiner.*